Patented Feb. 11, 1936

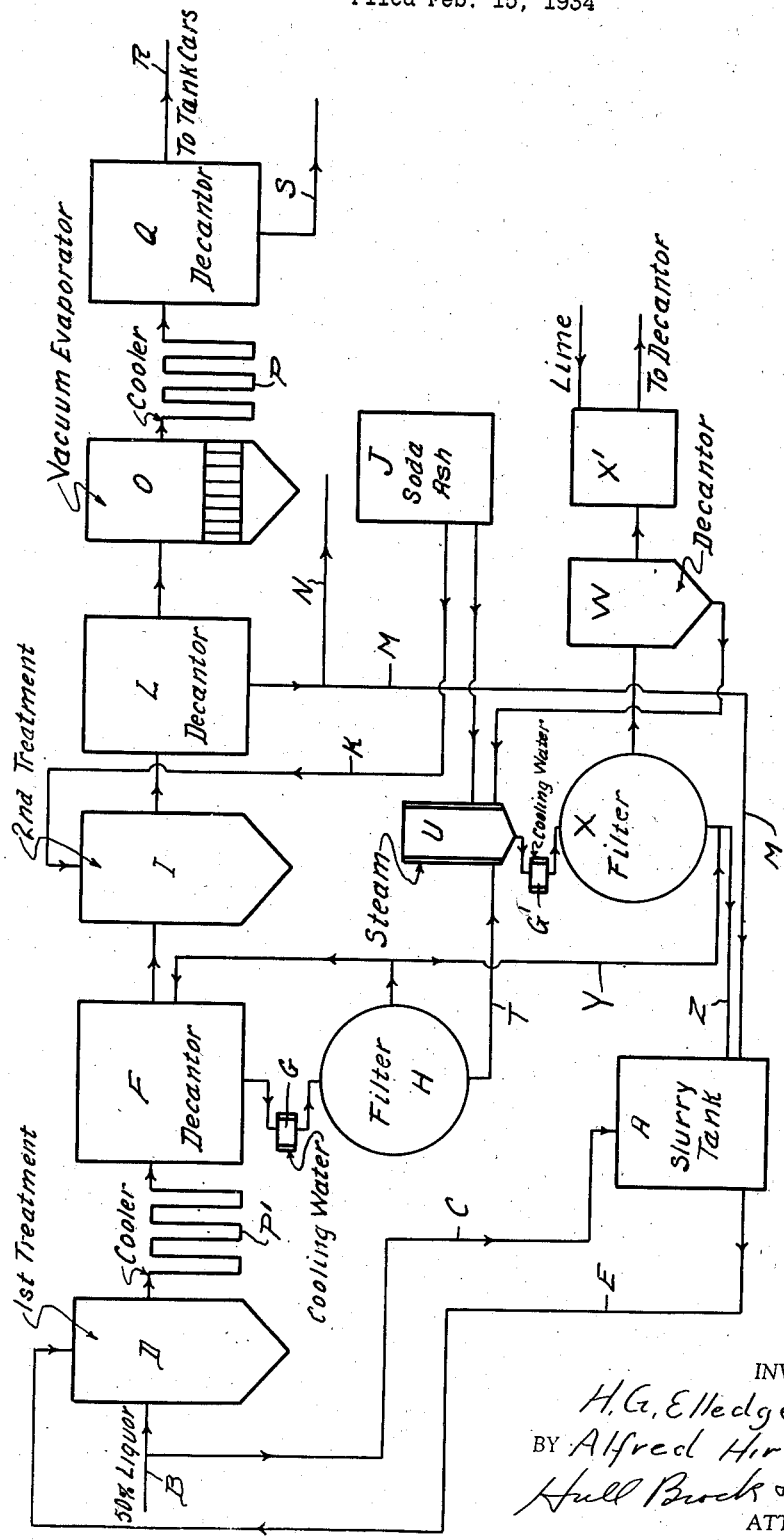

2,030,694

UNITED STATES PATENT OFFICE 2,030,694

PURIFICATION OF CAUSTIC SODA

Harvey G. Elledge and Alfred Hirsch, Painesville, Ohio, assignors to Diamond Alkali Company, Painesville, Ohio, a corporation of Delaware Application February 15, 1934, Serial No. 711,318

9 Claims. (Cl. 23—184)

This invention relates to a method of purifying caustic liquors, as produced either by the chemical or electrolytic processes.

An object of the invention is to provide a method (similar to that disclosed in our copending application Serial No. 679,076, filed July 5, 1933) which will render possible the use of strontium and barium carbonates as purifying agents as well as the hydroxides of barium and strontium and strontium sulphate.

A further object is to provide for a continuous process involving the use and reuse of strontium carbonate and/or barium carbonate as purifying agents and for the use of strontium sulphate in a manner to be converted into strontium carbonate and returned in that form to be substituted in whole or in part for the sulphate.

A further object is to provide a continuous process wherein strontium carbonate can be used and reused as a purifying agent and wherein a greater or lesser quantity of strontium sulphate can be added from time to time to compensate for losses of the carbonate.

A still further object is to provide a process for the purification of caustic liquors characterized by the fact that without interruption of this main process and without providing any additional mechanism, a greater or lesser amount of strontium sulphate can be converted into strontium carbonate either for the purpose of continuous reuse as a purifying agent or for any other desired purpose. Other and more limited objects will become apparent from the following description and will be pointed out in the claims.

The present preferred embodiment of our invention will now be described, reference being had to the accompanying drawing which is a flow sheet showing the sequence of steps in the process.

Assuming for illustration that the purifying agent employed is strontium carbonate, the same is placed in a slurry tank A, the caustic liquor to be purified is led in through the pipe line B from which a small part of it passes downwardly through the pipe line C to the slurry tank A whereby to form a slurry and the main portion of the caustic liquor is passed to the first treatment reaction receptacle D. The slurried purifying agent is led through the pipe line E to the reaction tank D, tank D being of such a type that the incoming liquor and reagent will be detained for a sufficient length of time before passing on for other treatment.

The caustic liquors led in through the pipe line B are of a concentration of the order of 50 per cent by weight of caustic soda, although it is to be understood that liquors of considerable variation from this concentration may be successfully treated. The contents of the reaction tank D are continuously agitated and the liquors admitted thereto are at a temperature near the boiling point, that is from 130° to 145° C. We prefer to operate at atmospheric pressures although it is possible to secure good results at other pressures, provided the various factors are adjusted accordingly. The strontium carbonate is added from tank A to the reaction tank D in the proportion of about 125 or more pounds per ton of caustic soda. The contact period in the reaction tank D is preferably about two hours although it does no harm to allow it to remain for a longer period and with efficient agitation the time may be reduced considerably below two hours. In fact, with particularly effective dispersion of the purifying reagent, the time may be reduced to one-half hour or less. The principal impurities to be removed by this process from caustic liquors are silica, alumina, and iron, all of which may be removed if present. In the reaction tank D, these impurities are present presumably in the form of the sodium salts. The strontium or barium carbonate partly dissolves in the caustic liquor in a manner to be converted to the hydroxide with the formation of soluble sodium carbonate. The strontium or barium hydroxide then reacts with the sodium salts of the impurities forming strontium silicate, strontium aluminate and, presumably, strontium ferrite (SrO.Fe$_2$O$_3$). This statement of the reactions probably represents an oversimplification of what actually occurs but it affords an hypothesis which for the purposes of this process suitably explains the reactions. The compounds formed by the reaction of strontium hydroxide with the impurities are precipitated. The reaction mixture from the reaction tank D is continuously passed through a cooler P', where the temperature is reduced to 70° to 90° C., to the continuous decanter F where the precipitate and its contained liquor are separated from the main portion of the liquor and pass downwardly through a cooling device G to a continuous filter H where the remaining liquor is separated from the precipitate and returned to the decanter F or passed to a further use which will hereinafter appear. Removal of silica and alumina is satisfactorily accomplished without the cooler P'. Iron is also satisfactorily removed without such cooler, that is, at a temperature of 130° to 145° C., if the devices D and F are composed of or lined with nickel although it is, even in that case, a little better at the lower temperatures. In case steel equipment is used (for devices D and F) the removal of alumina and silica is satisfactory at temperatures of 130° to 145° C. but the lower temperatures are necessary for satisfactory removal of iron, that is to reduce the iron content to 0.00015% which we desire to do. At a temperature of 110° C. in the device F, when the devices D and F are of steel, the iron content may be reduced to below 0.0005%.

The decantate is passed to the second reaction tank I, similar to that D, where it is continuously agitated. In the tank I, the liquor containing that portion of the dissolved strontium or barium which did not react with the impurities together with the sodium carbonate which was formed in the first treatment, are diluted to a concentration of the order of 32½ percent of sodium hydroxide by weight and treated with sodium carbonate. It is quite feasible to add water for dilution and the sodium carbonate separately but we prefer to employ an aqueous solution of sodium carbonate at a temperature of from 90° to 100° C. and containing about 4 percent by weight of sodium carbonate. This solution is conveniently prepared and maintained at the proper temperature in a tank J and led through a pipe line K to the second treatment reaction tank I as required. The quantity of 4 percent soda ash liquor added to the second treatment reaction tank may be for example enough to result in a sodium hydroxide concentration of about 440 grams per liter, or approximately 75 pounds of soda ash per ton of NaOH treated.

If the temperature of the liquors in the tank D and the decanter F have been maintained fairly constant by suitable insulation, the temperature in the second treatment reaction tank I will be from about 100° to 110° C. In case the cooler P' has been employed, the effect of which together with the effect of spontaneous cooling lowers the temperature in decanter F to as low as 70° C.–80° C., the heat of dilution of mixing the 50% NaOH liquor with 4% soda ash liquor or water is sufficient to restore the temperature of the 32½ percent sodium hydroxide solution in tank I to the desired temperature level of 100° to 110° C. In this dilution the strontium hydroxide will react with the sodium carbonate to form strontium carbonate and sodium hydroxide. The strontium carbonate thus formed together with any small quantity which may not have been converted to the hydroxide will be precipitated because of the presence of a large excess of the carbonate ion. The reaction mixture from the second treatment reaction tank I is passed to the second treatment continuous decanter L where the precipitated strontium carbonate is separated from the liquor and passed through the pipe line M to the slurry tank A for reuse or in part through the outlet pipe line N to suitable carbonate purification means where it may be prepared for market.

The decantate from the second treatment is passed to a concentrator O, preferably of the reduced pressure type, where it is concentrated to approximately the same concentration with respect to NaOH as before treatment; thence, through the cooling means P where it is cooled to any convenient temperature such as to the atmospheric temperature at the time obtaining. This treatment results in the precipitation of substantially all the sodium carbonate. This mixture is passed to a third continuous decanter Q where the caustic liquor is separated from the precipitated sodium carbonate and passed through the pipe line R to tank car settlers and to market. The precipitated sodium carbonate may be returned to the tank J or otherwise suitably disposed of, passing through the pipe line S.

The filter cake from the continuous filter H, having been slurried to pumping consistency with soda ash solution or water is passed through a pipe line T to a steam jacketed reaction tank U where it is treated with additional soda ash and sufficient water so that the soda ash used is approximately one half pound of soda ash per pound of reagent originally applied, and so that the water volume is approximately one half gallon per pound of reagent originally applied, resulting in the production of the sodium salt of the impurities and the regeneration of strontium or barium carbonate which is passed through a cooler G' through a continuous filter X from which the residue is returned through the pipe line Z to the slurry tank A and the filtrate is passed to a decanter W for a final settling of any residue and return of the same to the tank U and final passage of the sodium salts of the impurities, to a reaction chamber X' where they are treated with lime to convert them to the calcium salts, and sodium hydroxide is recovered. A portion of the filtrate from the filter H may be passed downwardly through the pipe line Y to repulp the residue from the filter X and assist its return along the pipe line Z to the slurry tank A.

In carrying out our process, we prefer to begin by using strontium sulphate as a purifying agent, the same being placed in the slurry tank A and slurried with the incoming caustic liquor in the same manner as in the process described for the use of strontium carbonate and which, it is to be understood, can be used for barium carbonate. Where this is done, the sulphate partly dissolves in the caustic forming the hydroxide and sodium sulphate. The purification goes forward in the same manner as where the carbonate is employed except that sodium sulphate is carried in solution in the liquor instead of sodium carbonate and is precipitated when the liquor is concentrated and cooled and is separated out in the continuous decanter Q, strontium carbonate being precipitated in the second treatment reaction tank I and separated by the continuous decanter L after which it is returned wholly or in part through the pipe line M to the slurry tank A. Optionally a part may be drawn off through the pipe line N and carried through suitable purification after which it is ready for market. It will be obvious from the foregoing that after a suitable amount of sulphate has been introduced into the system and converted into carbonate that the operation will be exactly the same as previously described with reference to the use of the carbonate alone. It will thus be seen that the cheaper material, strontium sulphate, may be used to start the process, after which the carbonate formed in the course of the process can be used and reused as a purifying agent.

Some of the purifying agent however will be lost and it will be desirable from time to time to add additional strontium sulphate to the slurry tank A or to reaction tank U to make up for such losses. In case strontium carbonate is drawn off through the pipe line N to be used for purposes outside the caustic purification process, it will be desirable to add a sufficient amount of the sulphate to make up the deficiency.

It will thus be seen that we have provided a process of purifying caustic liquors which makes possible the use of the carbonate, provides for recovery and reuse of the carbonate and produces from the relatively cheap sulphate a sufficient quantity of carbonate for carrying out the process and if desired for use for other purposes and for sale. A particularly advantageous feature of our invention is that, while making provision for the main process of purifying caustic soda, it also makes possible, without additional equipment or interference with the main process, a secondary process, namely, the production of an optional quantity of strontium carbonate according to demand. As before indicated, barium sulphate is not the equivalent of strontium sulphate in this process. Barium carbonate is however capable of being used instead of strontium carbonate, although not capable of being derived from the corresponding sulphate in the same manner. Having in mind this limitation, barium carbonate is to be understood as included where strontium carbonate is referred to in the claims.

While we have described our invention with reference to the present preferred embodiment, we wish it understood that our process may be practiced in varied forms, e. g. in batches instead of continuously, as described, and that we are not limited to the illustrative details but only in accordance with the spirit and scope of the appended claims and the prior art.

This application is a continuation in part of our copending application Serial No. 698,666, filed November 18, 1933.

Having thus described our invention, what we claim is:—

1. The process of purifying caustic soda liquor which comprises first treating such liquor with an excess of strontium sulphate above the molecular equivalent of the impurities to be removed thereby, removing the precipitated impurities, precipitating the excess strontium in the form of the carbonate by treating the liquor from the first treatment with water and soda ash, and continuously returning a portion of the so precipitated strontium carbonate to be substituted in par for the strontium sulphate in said first treatment.

2. The process which comprises first treating caustic soda liquor, containing impurities capable of reacting with strontium hydroxide to form solid compounds, with a purifying agent consisting of one or more compounds of the group consisting of strontium carbonate and strontium sulphate in an amount greater than the molecular equivalent of the impurities to be removed, removing the precipitated impurities, precipitating the excess strontium in the form of the carbonate by treating the liquor from the first treatment with water and soda ash and returning a part of the so precipitated strontium carbonate to the said first treatment.

3. The process which comprises treating caustic soda liquor of the order of fifty per cent by weight of sodium hydroxide with a purifying agent selected from the group consisting of strontium carbonate and mixtures thereof with strontium sulphate, in an amount greater than the chemical equivalent of the impurities to be removed, removing the resulting precipitated impurities, and then precipitating from the liquid portion the excess of the purifying agent as the carbonate by diluting the liquor from the first treatment to the order of thirty percent by weight of sodium hydroxide and treating it with sodium carbonate.

4. In a process for purifying caustic soda liquor and producing strontium carbonate, the steps of adding strontium in the form of the sulphate to caustic soda liquor as a purifying agent, removing the precipitated impurities, recovering the excess of said strontium in the form of the carbonate by diluting the resulting liquor with water and treating it with soda ash and returning a quantity of strontium in the form of such carbonate for use as the purifying agent, a greater quantity of said sulphate being added than necessary to purification, and less than all of said strontium in the form of said carbonate being returned for use in the purification process, whereby to produce a surplus of said carbonate for other use.

5. The process which comprises treating caustic soda liquor, containing one or more impurities of the group consisting of silica, alumina and iron, with an excess of a purifying substance of the group consisting of strontium sulphate, strontium carbonate and mixtures thereof, above the molecular equivalent of the impurities present, separating the precipitated strontium compounds of the impurities and treating them with soda ash whereby to recover strontium carbonate, diluting the liquid portion of the reaction mixture from the first treatment with water and treating it with soda ash whereby to recover the excess strontium as the carbonate, and returning the strontium carbonate from both sources for reuse in the process as the purifying agent.

6. The process which comprises treating caustic soda liquor, of the order of fifty percent concentration by weight and containing one or more impurities of the group consisting of silica, alumina and iron, with a purifying agent comprising an excess of strontium in the form of the sulphate above the molecular equivalent of impurities to be removed, separating the precipitated impurities from the liquid, and precipitating the excess strontium in the form of the carbonate by treating the liquid with a quantity of an aqueous solution of soda ash amounting to sufficient water to reduce the concentration of the caustic soda liquor to the order of thirty percent and sufficient sodium carbonate to cause precipitation of substantially all the strontium as the carbonate and returning a portion of said strontium in the form of said carbonate for reuse as the purifying agent in a continuation of the process.

7. The process of purifying caustic soda liquor containing small quantities of one or more impurities of the group consisting of silica, alumina and iron which comprises treating said liquor with a substance of the group consisting of strontium carbonate and mixtures of strontium carbonate and strontium sulphate in substantial excess of the molecular equivalent of the impurities to be removed, said caustic soda liquor being of such concentration as to dissolve substantially all the strontium carbonate, separating the precipitated impurities, and precipitating the excess strontium from the resulting liquor in the form of the carbonate by the addition of an aqueous solution of sodium carbonate.

8. The process of purifying caustic soda liquor containing small quantities of one or more impurities of the group consisting of silica, alumina and iron which comprises treating said liquor with a substance of the group consisting of strontium carbonate and mixtures of strontium carbonate and strontium sulphate in substantial excess of the molecular equivalent of the impurities to be removed, said caustic soda liquor being of such concentration as to dissolve substantially all the strontium carbonate, separating the precipitated impurities, and precipitating the excess strontium from the resulting liquor in the form of the carbonate by the addition of an aqueous solution of sodium carbonate, and then removing the strontium carbonate and concentrating the resulting liquor an amount sufficient to cause precipitation of substantially all sodium sulphate and sodium carbonate present.

9. In a process for substantially entirely freeing caustic soda liquor of silica, alumina and iron, the steps of treating such liquor with strontium in the form of the sulphate, removing the precipitated impurities, recovering substantially all the strontium in the form of the carbonate and treating an additional portion of such liquor with a portion of the recovered strontium carbonate, such additional portion of caustic soda liquor being of a concentration sufficient to dissolve said strontium carbonate.

HARVEY G. ELLEDGE.
ALFRED HIRSCH.